Sept. 6, 1955 S. LOEWE 2,716,962

TUNING DEVICE FOR BROADCAST RECEIVERS OR THE LIKE

Filed Oct. 23, 1951

Inventor:

Siegmund Loewe

United States Patent Office 2,716,962
Patented Sept. 6, 1955

2,716,962

TUNING DEVICE FOR BROADCAST RECEIVERS OR THE LIKE

Siegmund Loewe, Yonkers, N. Y.

Application October 23, 1951, Serial No. 252,737
11 Claims. (Cl. 116—124.4)

Figures 1, 2:
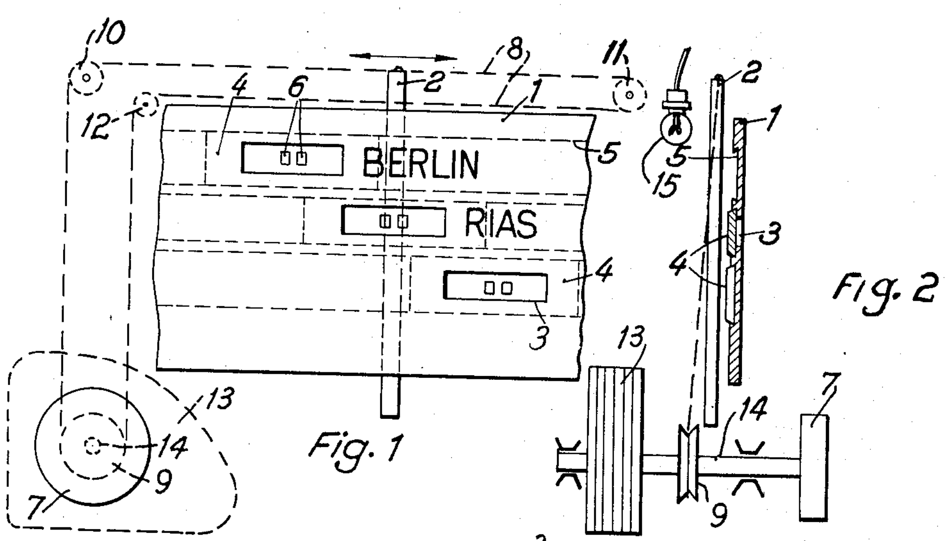

The present invention relates to a novel device for marking the tuning position at broadcast receivers or the like, its particular object being the rapid and accurate accomplishment of tuning with simple mechanical means.

Up to this time, for sharp tuning the magic eye, i. e. a relatively expensive electric-optical device, has found wide-spread application. However, the accurate tuning-in of a transmitter station by means of the magic eye needs a certain experience as the optimal tuning position, is not fixed but must be adjusted by the more or less skillful user. Moreover, this device is useless at weak transmitters.

At the dials in common use for broadcast receivers a further disadvantage is that, owing to frequency variations of the transmitters and modifications of the electrical data of the set, after some time the accurate tuning position of the single stations is no more in coincidence with the adjustment marks on the tuning dial. Then it is difficult quickly to re-establish the accurate tuning position of the wanted station.

The present invention removes these disadvantages and also saves the magic eye. It allows, by simple means, the sharp tuning-in of a set to the single transmitter stations. According to the present invention, in or behind the slots of the tuning dial, which correspond to the single transmitter stations, adjustably inserted pieces are mounted, preferably plate-shaped and provided with marks, e. g. holes; the dial pointer is adjusted to these marks in a previously determined way. These insert pieces are adjustable from outside; this adjustment to the tuning position of the single station can be accomplished for instance by means of a pointed tool which is introduced e. g. into one of the marking holes of the insert piece; in the same manner the position of these insert pieces can be, at any time, readjusted if necessary. Thus, an easy correction of the station marks from outside is rendered possible if the electrical data of the set should have changed.

The guiding of the inserted pieces can be achieved in many ways. The simplest is to provide wire loops at the backside of the dial plate, e. g. by soldering, the insert pieces being inserted into these wire loops and held by them. Instead, the dial plate can be provided with slots or grooves, e. g. by stamping, into which the insert pieces are inserted. Even a magnetic holder can be employed if the dial plate and the insert pieces are made of magnetizable materials.

The illumination of the dial arrangement corresponding to this invention can be likewise accomplished in different ways. For instance, the dial pointer itself can be lighted, e. g. by floodlight, so that it is represented by a clear-cut luminous slot of a certain width. This luminous slot must be adjusted, in a previously defined manner, to the marking provided on the insert piece in order to get a sharp tuning-in of the respective transmitter station. This marking of the insert piece can consist e. g. of two holes arranged side by side which subdivide the luminous slot of the pointer into two comparable portions and in each of which one luminous slot of equal width must be visible at the position of sharp tuning. As long as the two luminous slots are not of equal width, the tuning is not yet sharp.

A further design of the illumination can be arranged so that the dial gets a general illumination from backwards in the commonly known manner and that a black pointer is adjusted to a luminous slot. Exactly sharp tuning is accomplished for instance as soon as the pointer subdivides this luminous slot into two equal portions.

Furthermore, according to another object of this invention a small glow lamp can be mounted behind each insert piece instead of providing a general illumination; in this case the dial pointer once more appears as a black line in the luminous slot of the insert piece. The glow lamps have the advantage of a small current consumption and easy interchangeability.

At the arrangement corresponding to this invention, the direct light sources can be replaced, too, by indirect ones, i. e. by marks coated with phosphorescent materials which are flood-lighted by a corresponding light source.

The present invention shall be described referring to the drawings in which different examples of the design are shown in their principal arrangement. Fig. 1 shows a part of the dial plate of a broadcast receiver. Fig. 2 is the corresponding side view in section (section approximately along the pointer shown in Fig. 1). The dial plate 1 is provided on its backside with several rows of grooves 5 which correspond to the station rows arranged on the dial. The insert pieces 4 are mounted so that they can be adjusted sliding along these grooves 5. The insert pieces are provided with a hole marking consisting of two holes 6; they are arranged so that they can be adjusted behind the slots 3 which are provided in the dial plate 1 and correspond each to one transmitter station. The pointer 2 is coupled with a tuning knob 7 by means of a cord drive consisting of cord 8 and pulleys 9, 10, 11, and 12. By operating tuning knob 7 the condenser plates 13 mounted on the same axis 14 are adjusted for tuning-in any desired station, and simultaneously the pointer 2 is moved along the dial plate 1 for indicating the tuned-in station. The illumination of the dial plate may be performed by means of lamp 15 from the backside of the dial plate in known manner. In this case pointer 2 is for instance dark, and the hole 6 in the insert pieces are bright. Sharp tuning is effected as soon as the pointer 2 lets appear two equal bright portions of the two neighbouring holes 6 in one and the same insert piece 4. The pointer 2 also may be e. g. a glass rod actuated by means of the tuning knob and illuminated by floodlight. First and foremost, this pointer 2 is carefully and accurately adjusted to the slot of the corresponding transmitter, preferably by ear. Then the corresponding insert piece 4 is adjusted, e. g. by means of introducing a pointed object into one of the holes 6 in such a manner that in both holes 6 an equal width of the illuminated pointer is visible. Thus, in this position the sharp tuning of the set is warranted. Independently from further movements of the pointer the insert piece 4 now remains in this position and the pointer 2 can quickly and without tedious trials be again brought into the position just described whereby a long search for the position of sharp tuning is avoided. At an eventual change of the transmitting frequency of the station or the electrical data of the set the tuning position can be easily corrected by a corresponding re-adjustment of the insert pieces 4.

Figure 3:
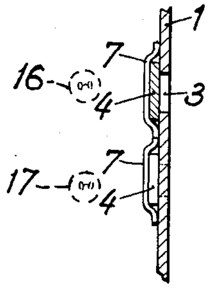
Figure 4:
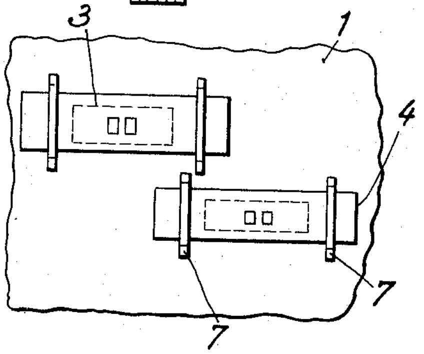

According to Fig. 3 the insert pieces 4 can be held, too, by means of simple wire loops instead of grooves. Behind each of the slots 3 wire loops 7 in which the insert pieces 4 are guided, are soldered to the backside of the dial plate 1. Suitably each of the insert pieces 4 is held by two wire loops as shown in Fig. 4 representing a back-view of a part of the dial plate. As shown in Fig. 3 glow lamps 16, 17 may be arranged behind each insert piece 4 and slot 3. In this case the lamp 15 shown in Fig. 2 may be omitted.

Figure 5:
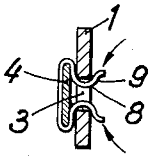

Fig. 5 shows a further design of the device holding the insert pieces 4 in the dial plate 1. By suitably bent springs 8, made e. g. of narrow spring steel band, part 4 is rigidly held behind the slot 3. By pressing together the spring ends 9, which project from the front side of the dial plate, in the direction of the arrows shown in the drawing the holding device can be loosened whereupon the insert piece 4 can be easily adjusted.

What I claim is:

1. In a radio receiving set a tuning indicator device comprising in combination a station dial plate carrying the station names and supplied with slots, each of which is associated with one station name, insert pieces adjustably mounted behind said slots in said dial plate, tuning means for turning the radio set by means of a tuning knob, a pointer movable along said dial plate by operation of said tuning knob, said tuning knob being coupled by a suitable drive with said tuning means and simultaneously with said pointer, thus designating the position of the tuning means on the dial plate, said insert pieces being slidably mounted on said dial plate and provided with means adapted to shift said insert pieces with regard to said dial plate by hand from outside through said slots, thus enabling a readjustment of the exact tuning of the set to single stations to be received.

2. Tuning device as claimed in claim 1, wherein the dial plate is provided on its backside with grooves in which said insert pieces are slidably arranged behind said slots in the dial plate.

3. Tuning device as claimed in claim 2 wherein the insert pieces are supplied with a hole marking consisting of two holes and adapted to serve as a sharp tuning mark and further adapted to introduce from outside a pointed tool into one of the holes for shifting said insert pieces.

4. Tuning device as claimed in claim 2, wherein the insert pieces are supplied with two holes arranged side by side and subdividing the pointer adjustable behind said holes by said tuning knob of the receiver set, into two equal portions visible through said holes in case of sharply tuning the receiver set.

5. Tuning device as claimed in claim 1, wherein said insert pieces are attached behind said slots within in the station dial plate by means of bent springs mounted within said slots and including said insert pieces, the ends of the springs projecting from the front side of said dial plate adapted to be loosened by pressing together the spring ends for enabling shifting of said insert pieces.

6. Tuning device as claimed in claim 1, wherein said insert pieces are magnetically attached to the station dial plate, the latter and the insert pieces consisting of magnetizable material and being shiftable by overcoming the magnetic force by hand from outside.

7. Tuning device as claimed in claim 1, wherein said insert pieces are shiftably inserted behind said slots into wire loops provided on the backside of the station dial.

8. Tuning device as claimed in claim 1, wherein said pointer consists of a glass rod actuated by means of said tuning knob and illuminated by floodlight as well as said dial plate.

9. Tuning device as claimed in claim 1, wherein said pointer consists of not translucent material, said dial plate being illuminated from the backside in known manner.

10. Tuning device as claimed in claim 1, wherein each of said insert pieces is illuminated by a small glow lamp mounted behind each insert piece in known manner.

11. Tuning device as claimed in claim 1, wherein said dial plate and said insert pieces are supplied with marks consisting of phosphorescent material excited by a light source.

References Cited in the file of this patent

UNITED STATES PATENTS

| | | |
|---|---|---|
| 1,955,085 | Osborn | Apr. 17, 1934 |

FOREIGN PATENTS

| | | |
|---|---|---|
| 146,901 | Austria | Sept. 10, 1936 |